United States Patent
Nishimoto et al.

(10) Patent No.: US 6,292,847 B1
(45) Date of Patent: Sep. 18, 2001

(54) DIGITAL INFORMATION REPRODUCING APPARATUS AND DIGITAL INFORMATION DISTRIBUTING SYSTEM

(75) Inventors: Yoshiro Nishimoto; Takashi Morita; Toshiro Yamashita; Tetsuya Takahashi; Toshiaki Shimoda, all of Kobe; Kazushige Harada, Tokyo, all of (JP)

(73) Assignee: Kabushiki Kaisha Kobe Seiko Sho., Kobe (JP)

( * ) Notice: Subject to any disclaimer, the term of this patent is extended or adjusted under 35 U.S.C. 154(b) by 0 days.

(21) Appl. No.: 09/203,751

(22) Filed: Dec. 2, 1998

(30) Foreign Application Priority Data

Dec. 3, 1997 (JP) .................................................... 9-333104
Dec. 26, 1997 (JP) .................................................... 9-359031

(51) Int. Cl.[7] ............................. G06F 3/00; G06F 13/12; G06F 13/38
(52) U.S. Cl. ................................... 710/5; 710/5; 710/68; 710/69
(58) Field of Search .............................. 710/4, 5, 68, 33, 710/69; 714/752

(56) References Cited

U.S. PATENT DOCUMENTS

| | | | |
|---|---|---|---|
| 5,293,388 | * | 3/1994 | Monroe et al. ........................ 714/752 |
| 5,319,751 | * | 6/1994 | Garney ................................. 711/115 |
| 5,357,614 | * | 10/1994 | Pattisam et al. ........................ 710/68 |
| 5,428,592 | * | 6/1995 | Endo ....................................... 369/48 |
| 5,617,386 | * | 4/1997 | Choi ....................................... 369/32 |
| 5,640,592 | * | 6/1997 | Rao .......................................... 710/5 |
| 5,812,883 | * | 9/1998 | Rao ......................................... 710/74 |
| 5,930,358 | * | 7/1999 | Rao .......................................... 380/4 |

* cited by examiner

Primary Examiner—Thomas Lee
Assistant Examiner—Chun Cao
(74) Attorney, Agent, or Firm—Reed Smith Hazel & Thomas LLP (57) ABSTRACT

A digital information reproducing apparatus in accordance with a prior art that uses a semiconductor memory to realize a memory means cannot reproduce digital data which has been encoded according to a compression coding form different from the one adopted by an incorporated decoding circuit. According to the present invention, a decoding program stored in a second semiconductor memory is selected according to a compression coding form adopted for digital data stored in a first semiconductor memory. The selected decoding program is used to decode the digital data by means of an arithmetic circuit. Thus, digital information can be reproduced irrespective of a compression coding form adopted for provided digital information.

13 Claims, 8 Drawing Sheets

DIGITAL INFORMATION REPRODUCING APPARATUS AND DIGITAL INFORMATION DISTRIBUTING SYSTEM

BACKGROUND OF THE INVENTION

1. Field of the Invention

The present invention relates to a digital information reproducing apparatus and digital information distributing system. More particularly, this invention is concerned with a digital information reproducing apparatus and digital information distributing system that employ a semiconductor memory as a digital information storage medium, store digital information in a compressed and thus encoded state, and decode and reproduce the digital information.

2. Description of the Related Art

Figure 10:
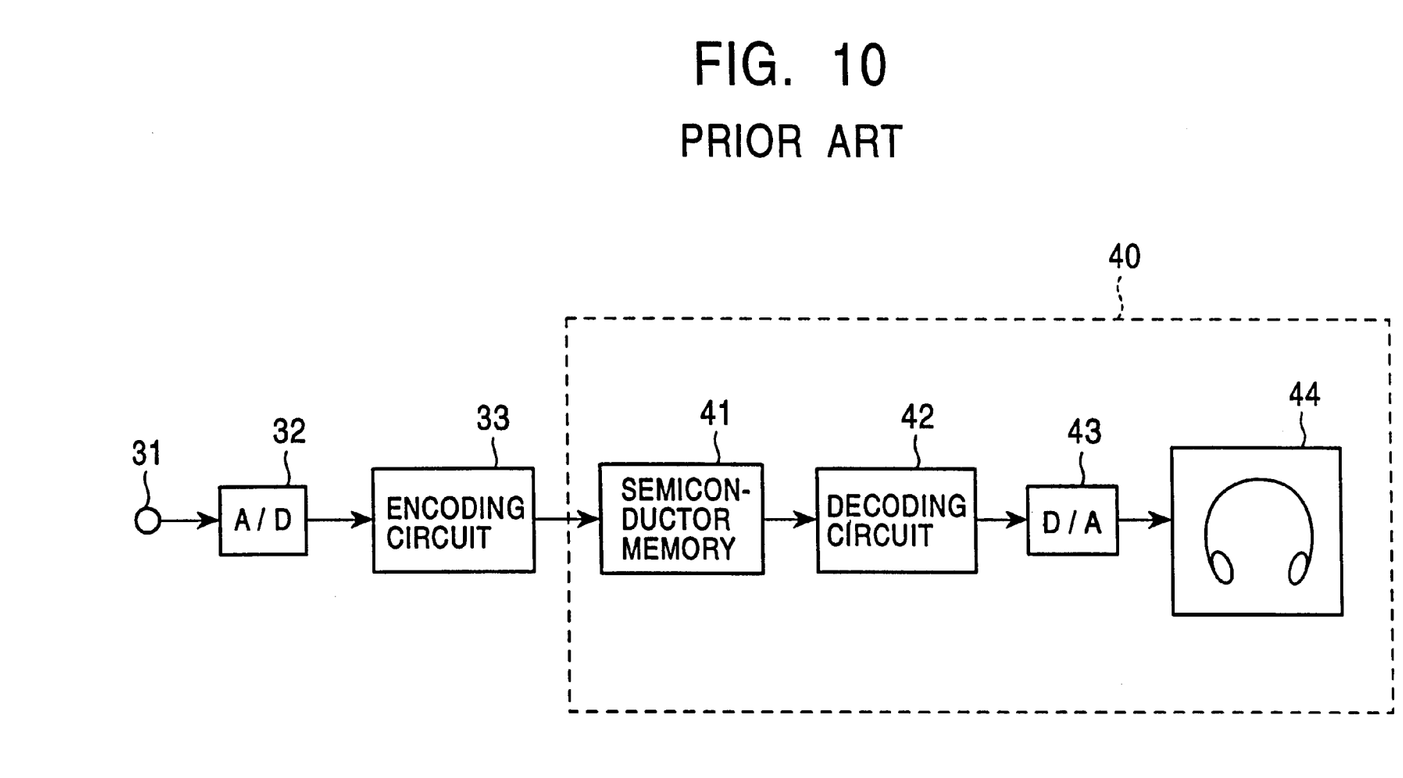
FIG. 10 is a functional block diagram showing the outline configuration of a compact musical signal reproducing apparatus in accordance with a prior art.

A digital information reproducing apparatus in accordance with a prior art which employs a semiconductor memory is, for example, described in Japanese Unexamined Patent Publication No. 3-139700. FIG. 10 is a functional block diagram showing the outline configuration of a compact musical signal reproducing apparatus described in the patent publication.

As shown in FIG. 10, a compact musical signal reproducing apparatus 40 in accordance with the prior art has a semiconductor memory 41, decoding circuit 42, D/A converter 43, and headphone unit 44 incorporated therein.

In the semiconductor memory 41, musical digital data that has been encoded highly efficiently by an encoding circuit 33 is stored in advance. As stages preceding the encoding circuit 33, an input terminal 31 and an A/D converter 32 are installed. A musical analog signal supplied through the input terminal 31 is converted into a digital signal by the A/D converter 32 and supplied to the encoding circuit 33.

The musical digital data stored in the semiconductor memory 41 is decoded by the decoding circuit 42 in the apparatus 40, and thus restored to an original musical digital signal. The digital signal is then converted into an analog electric signal by the D/A converter 43, and converted into an acoustic signal by the headphone unit 44. Eventually, music is output.

However, in the foregoing digital information reproducing apparatus of the prior art, the specified decoding circuit that has been incorporated in the course of manufacturing is used to decode data. Data that has been compressed and thus encoded in a different coding form cannot be reproduced at all. Thus, a problem of software incompatibility occurs.

SUMMARY OF THE INVENTION

The present invention attempts to solve the problem underlying the prior art. An object of the present invention is to improve a digital information reproducing apparatus and provide a digital information reproducing apparatus capable of coping with diverse compression coding forms.

For accomplishing the above object, the present invention provides a digital information reproducing apparatus comprising: a first semiconductor memory in which highly efficiently encoded digital data is stored; a second semiconductor memory in which decoding programs used to carry out decoding, which is inverse processing of high-efficiency encoding, are stored; and a decoding means for decoding the digital data stored in the first semiconductor memory according to a decoding program stored in the second semiconductor memory and associated with the digital data stored in the first semiconductor memory. A plurality of kinds of decoding programs is stored in the second semiconductor memory. The decoding means selects one of the plurality of kinds of decoding programs according to information concerning encoding appended to the digital data, and carries out decoding.

In the digital information reproducing apparatus, a decoding program stored in the second semiconductor memory and associated with digital data stored in the first semiconductor memory is used to decode the digital data stored in the first semiconductor memory. Information can therefore be reproduced from digital data irrespective of a compression coding form adopted for the digital data stored in the first semiconductor memory. Consequently, the digital information reproducing apparatus can cope with diverse compression coding forms.

Moreover, in the digital information reproducing apparatus, for example, a rewritable semiconductor memory such as a flash memory may be used as the whole or part of the second semiconductor memory. Even if an associated decoding program is not stored in the second semiconductor memory in advance, the contents of the second semiconductor memory may be updated in order to store a new decoding program therein. Consequently, digital signals conformable to more diverse compression coding forms can be reproduced. Moreover, at this time, the rewritable semiconductor memory need not be used as the whole of the second semiconductor memory but may be used as part thereof. In this case, only the portions of the decoding programs specialized according to a specified compression coding form may be stored in the rewritable memory. The fundamental portions thereof may be stored in a masked ROM or the like.

Furthermore, the digital information reproducing apparatus may include a read-only memory in which a common portion shared by the plurality of kinds of decoding programs is stored, a program storage memory in which the portions of the plurality of kinds of decoding program other than the common portion are stored, a selector for selecting a portion of a decoding program, which is selected to be associated with digital data to be decoded from among the plurality of kinds of decoding programs, other than the common portion from among the programs stored in the program storage memory, and a rewritable memory in which the program selected by the selector and copied from the program storage memory is stored.

Owing to the above configuration, the number of memories in the digital information reproducing apparatus can be decreased, the time required to load a program to an arithmetic circuit can be shortened, and the whole apparatus can be reduced in scale. Moreover, a plurality of non-common portion programs may be made available in advance but a non-common portion program may not be rewritten externally. In this case, even a simple selector can select a non-common portion program that should be adopted at that time. Consequently, decoding is executed as if it were executed in a reproducing apparatus dedicated to decoding.

Moreover, in the digital information reproducing apparatus, a rewritable memory, for example, a flash memory may be used as the whole or part of the first semiconductor memory. In this case, not only reproducing digital data but also recording it at a high speed can be achieved.

Moreover, in the digital information reproducing apparatus, a receiver for receiving digital data externally may be included. In this case, digital data can be updated readily.

Moreover, in the digital information reproducing apparatus, all or part of the decoding programs may be stored in the second semiconductor memory via the receiver. In this case, for example, a decoding program associated with digital data stored in the first semiconductor memory may not be stored in the second semiconductor memory. Nevertheless, an associated decoding program can be obtained via the receiver. Consequently, digital information structured according to more diverse compression coding forms can be reproduced.

Moreover, in the digital information reproducing apparatus, the whole or part of the second semiconductor memory may be a detachable module. Otherwise, the whole of part of the first semiconductor memory may be a detachable module. In this case, digital data or decoding programs can be replaced with another readily. The storage capacity of the first or second semiconductor memory can be increased according to a situation. The digital data or decoding programs can be distributed to the others readily.

Moreover, in the digital information reproducing apparatus, the first semiconductor memory may be composed of a plurality of blocks. Digital data may then be stored so that the start thereof will appear at the start of a block. In this case, a specified portion of the digital data can be deleted comprehensively without the need of complex addressing. Eventually, the efficiency in deletion can be improved.

Furthermore, the first semiconductor memory may consist of blocks of different sizes. The digital information reproducing apparatus may further include a memory block selection control means for, when digital data cannot be accommodated by a certain block, selecting another block whose size corresponds to the size of a remnant of the digital data, and storing the remnant in the another block. When the blocks are too short to accommodate data, a remnant may often be created. Even in this case, the remnant can be stored in a block whose size corresponds to that of the remnant. Consequently, data can be deleted comprehensively, and the use efficiency of a memory can be improved.

Furthermore, the present invention provides a digital information distributing system. The digital information distributing system consists of: a digital information distributing apparatus for storing given digital information; a digital information reproducing apparatus, connected to the digital information distributing apparatus, for receiving, storing, and reproducing the digital information stored in the digital information distributing apparatus; a conversion arithmetic means, incorporated in the digital information distributing apparatus, for performing given conversion on the digital information; a transmitting means, incorporated in the digital information distributing apparatus, for transmitting the digital information that has undergone given conversion, and a program used to inversely convert the digital information that has undergone the given conversion; a receiving means, incorporated in the digital information reproducing apparatus, for receiving the digital information that has undergone the given conversion, and the program used to inversely convert the digital information that has undergone the given conversion; and an inverse-conversion arithmetic means, incorporated in the digital information reproducing apparatus, for inversely converting the digital information that had undergone the given conversion and been received by the receiving means and. Herein, the given conversion is compression encoding. The inverse conversion is decoding of the digital information that has been compressed and thus encoded.

Furthermore, the digital information distributing system may include an ID code memory means incorporated in the digital information reproducing apparatus, and used to store an ID code specific to the digital information reproducing apparatus; and an ID code reading means, incorporated in the digital information distributing apparatus, for reading the ID code stored in the ID code memory means. The given conversion includes processing based on the ID code. The inverse conversion arithmetic means in the digital information reproducing apparatus carries out inverse processing of the ID code-based processing.

According to the digital information distributing system of the present invention, digital information having undergone given conversion (for example, compression encoding) and an inversely converting program are transmitted from the digital information distributing apparatus to the digital information reproducing apparatus employed by a customer. The digital information reproducing apparatus stores the inversely converting program in a rewritable memory. According to the inversely converting program, the received digital information is converted inversely and thus reproduced. Even when a conversion form has been modified or a different conversion form is adopted for each digital information, the digital information distributing system will prove useful.

Moreover, before digital information is transmitted to the digital information reproducing apparatus, the digital information distributing apparatus may perform given processing on the digital information using a specific ID code received from the digital information reproducing apparatus. In this case, the digital information reproducing apparatus performs inverse processing based on the own specific ID code on the received digital information. The digital information is then inversely converted according to the inversely converting program, and then reproduced. Thus, for example, digital information received from the digital information distributing apparatus is copied to another digital information reproducing apparatus having a different ID code. The digital information cannot be reproduced because the inverse processing cannot be carried out. Thus, wicked copy of digital information can be prevented effectively.

Furthermore, the inversely converting program for carrying out inverse conversion may be transmitted together with the digital information. In this case, a sequence of ID code-based processing can be modified periodically. Wicked copy can therefore be prevented more effectively.

DESCRIPTION OF THE PREFERRED EMBODIMENTS

Figure 1:
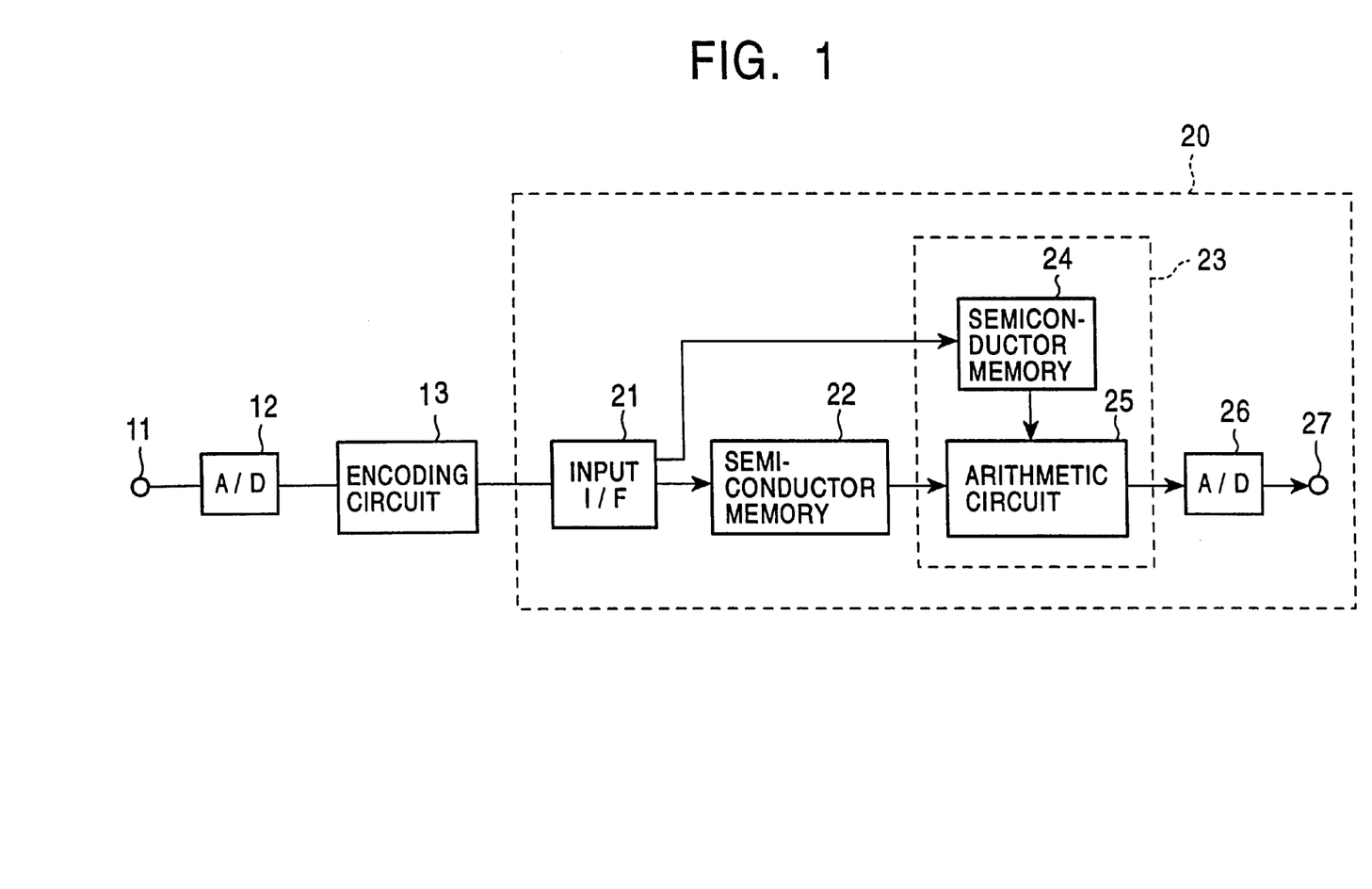
FIG. 1 is a functional block diagram showing the outline configuration of a compact musical signal reproducing apparatus in accordance with an embodiment of the present invention.

Referring to the appended drawings, embodiments of the present invention will be described below for a better understanding of the present invention. The embodiments are practical examples of the present invention but do not limit the technological scope of the present invention. FIG. 1 is a functional block diagram showing the outline configuration of a compact musical signal reproducing apparatus in accordance with an embodiment of the present invention.

As shown in FIG. 1, a compact musical signal reproducing apparatus 20 in accordance with an embodiment consists of an input interface (receiver) 21, a first semiconductor memory 22, a second semiconductor memory 24, an arithmetic circuit (decoding means) 25, a D/A converter 26, and an electric-to-acoustic converter 27. Herein, the input interface 21 inputs musical digital data that has been encoded highly efficiently according to a given audio coding technique. In the first semiconductor memory 22, the musical digital data that is input through the input interface 21 is stored. In the second semiconductor memory 24, decoding programs input through the input interface 21 and used to carry out decoding that is inverse processing of the high-efficiency encoding are stored. The arithmetic circuit 25 uses the decoding program, which is stored in the second semiconductor memory 24 and associated with the musical digital data stored in the first semiconductor memory 22, to decode the musical digital data stored in the first semiconductor memory 22. The D/A converter 26 converts an output signal of the arithmetic circuit 25 into an analog signal. The electric-to-acoustic converter 27 converts an output signal of the D/A converter 26 from an electric signal to an acoustic signal.

In the compact musical signal reproducing apparatus 20, an interface conformable to, for example, the PCMCIA standard (stipulating standards on connectors) or IrDA standard (stipulating standards on infrared communication) is used as the input interface 21. What is input through the input interface 21 is musical digital data that has been compressed and thus encoded according to, for example, the acoustic weighted vector quantization developed by the NTT Human Interface Laboratory, or the transform-domain weighted interleave vector quantization (TwinVQ).

It is an encoding circuit 13 connected to the input terminal of the input interface 21 that carries out the compression encoding. As stages preceding the encoding circuit 13, an audio input terminal 11 and an A/D converter 12 are installed. A musical analog signal input through the audio input terminal 11 is converted into a musical digital signal by the A/D converter 12, and highly efficiently encoded by the encoding circuit 13 according to a given audio coding technique, for example, the TwinVQ.

According to the TwinVQ, any of various sampling rates and bit rates can be selected according to the capacity in bits of a communication line or memory. For example, for a sampling rate of 8 kHz, a bit rate of 8 kilobits per second (kbps) per channel is selective. For a sampling rate of 11.025 kHz, any of bit rates ranging from 8 kbps to 10 kbps is selective. For a sampling rate of 22.05 kHz, any of bit rates of 20, 24, and 32 kbps is selective. Moreover, for a sampling rate of 44.1 kHz ensuring musical quality of the same level as the level offered by so-called compact disks (CDs), any of bit rates ranging from 40 kbps to 48 kbps is selective.

According to the TwinVQ, the sampling rate of 22.05 kHz and the bit rate of 20 kbps shall be selected. In this case, music of 50 min long is compressed and thus encoded in the form of musical digital data of 120 megabits long as follows:

20 kbps/channel×2 channels×60 sec×50 min=120M bits

When an interface conformable to, for example, the IrDA/ver.1.1 standard is used as the input interface 21, a transmission rate permitted by the interface is 4 megabits per second (Mbps). Input of the musical digital data of 120M bits long produced by compressing the musical analog signal representing the music of 50 min long is completed in 30 sec. When an audiotape is used for recording, music of 50 min long is recorded for 50 min. Therefore, when musical digital data is input through the input interface 21 and stored in the first semiconductor memory 22, recording can be achieved quite efficiently.

A rewritable nonvolatile memory, for example, a flash memory is used to realize the first semiconductor memory 22. For example, four locally procurable flash memories each having a storage capacity of 32M bits are employed. Thus, a storage capacity of 128M bits is ensured in total. The musical digital data of 120M bits long produced by compressing the music of 50 min long can therefore be stored reliably. The first semiconductor memory 22 can be rewritten. An output signal of the input interface 21 is stored in the first semiconductor memory 22, whereby the musical digital data is recorded.

Figure 2:
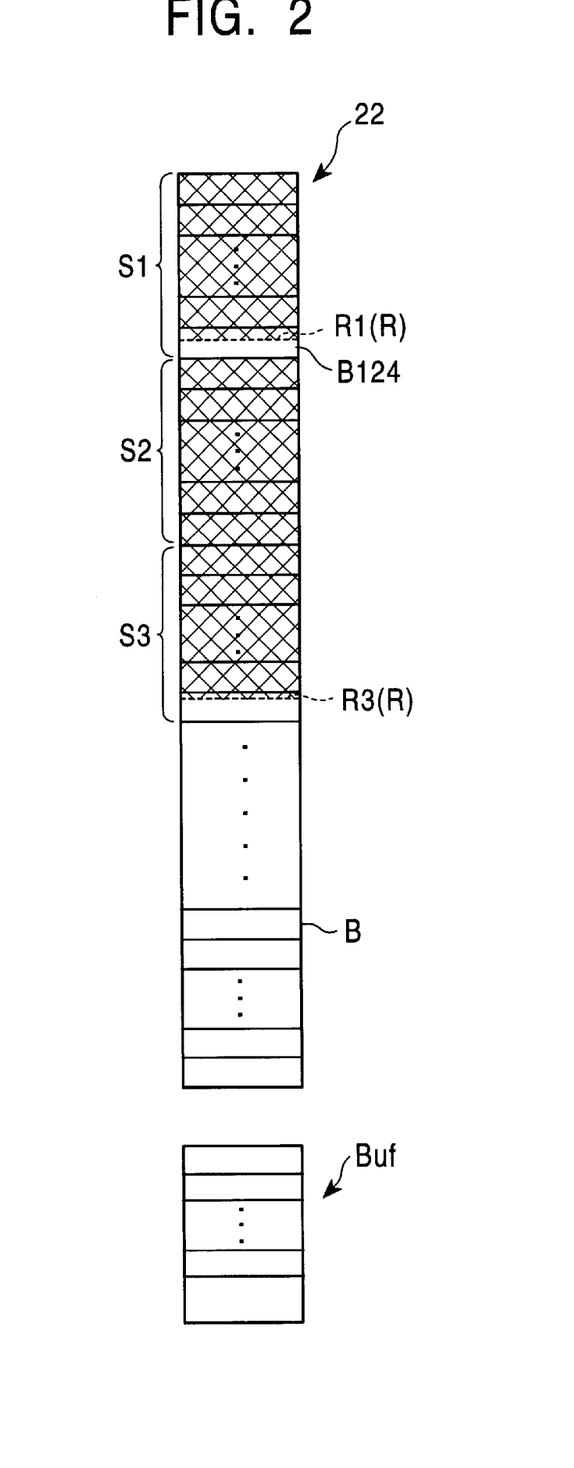
FIG. 2 is a diagram for explaining tune deletion to be performed by utilizing comprehensive block deletion.

Moreover, the flash memory adopted for the first semiconductor memory 22 has an ability to delete data comprehensively. As a unit of management for comprehensive deletion, there is a unit of addressing referred to as a block. The flash memory is, as shown in FIG. 2, composed of a plurality of blocks B each of which is a unit of comprehensive deletion. When the storage capacity is, as mentioned above, for example, 32M bits, the size of a block to be deleted comprehensively is 32 k words, that is, 512 k bits. Assuming that ten tunes (one tune lasts 5 min on average) are sent for 50 min, since one tune is represented by about 12M bits, one tune is stored divided into approximately 24 blocks B. Note that these numerical values vary depending on the kind of music.

For deleting a specified tune, if block deletion can be utilized, processing becomes quick and simple. Preferably, therefore, different tunes should not be stored in the same block B. In this embodiment, tunes are stored so that the start of each tune will appear at the start of a block B. A block having been used incompletely (for example, a block B124) may be created between the end of a certain tune (for example, a tune S1) and the start of the next tune (for example, a tune S2). Every 25th block becomes such a block. For this reason, comprehensive deletion is superior in efficiency to complex addressing without comprehensive deletion. Moreover, a buffer area Buf is defined as the last part of the first semiconductor memory 22. Owing to this structure, assuming that a specified tune is deleted in order to record a new tune in place thereof, while the new tune is being written in the buffer area, a group of blocks B in which the specific tune has been written can be deleted.

Musical digital data stored in the first semiconductor memory 22 is decoded by the arithmetic circuit 25 according to a decoding program stored in the second semiconductor memory 24 and associated with the musical digital data stored in the first semiconductor memory 22.

A rewritable nonvolatile memory, for example, a flash memory is used to realize the second semiconductor memory 24. Moreover, a programmable arithmetic means, for example, a 16-bit fixed-point digital signal processor (DSP) is used as the arithmetic circuit 25. The second semiconductor memory 24 and arithmetic circuit 25 constitute the decoding circuit 23.

A group of decoding programs associated with compression coding forms that are based on, for example, the aforesaid TwinVQ but define various sampling rates, are stored in the second semiconductor memory 24.

Any of the decoding programs stored in the second semiconductor memory 24 is used to reproduce musical digital data stored in the first semiconductor memory 22. At this time, information indicating what kind of compression coding has been carried out is read from header information contained in the musical digital data stored in the first semiconductor memory 22 by means of the arithmetic circuit 25. A decoding program associated with a compression coding form adopted for the musical digital data is loaded from the second semiconductor memory 24 to the arithmetic circuit 25. The arithmetic circuit 25 decodes the musical digital data according to the loaded decoding program.

A musical digital signal restored by the arithmetic circuit 25 is converted into an analog signal by the D/A converter 26, and then output to the electric-to-acoustic converter 27 such as a headphone. The electric-to-acoustic converter 27 converts the analog electric signal into an acoustic signal. Eventually, music is output.

As mentioned above, in the compact musical signal reproducing apparatus of this embodiment, any of the decoding programs stored in the second semiconductor memory is selected according to a compression coding form adopted for musical digital data stored in the first semiconductor memory. The selected decoding program is used to decode the musical digital data by means of the arithmetic circuit. Music can therefore be reproduced irrespective of a compression coding form adopted for a provided musical signal.

Figure 3:
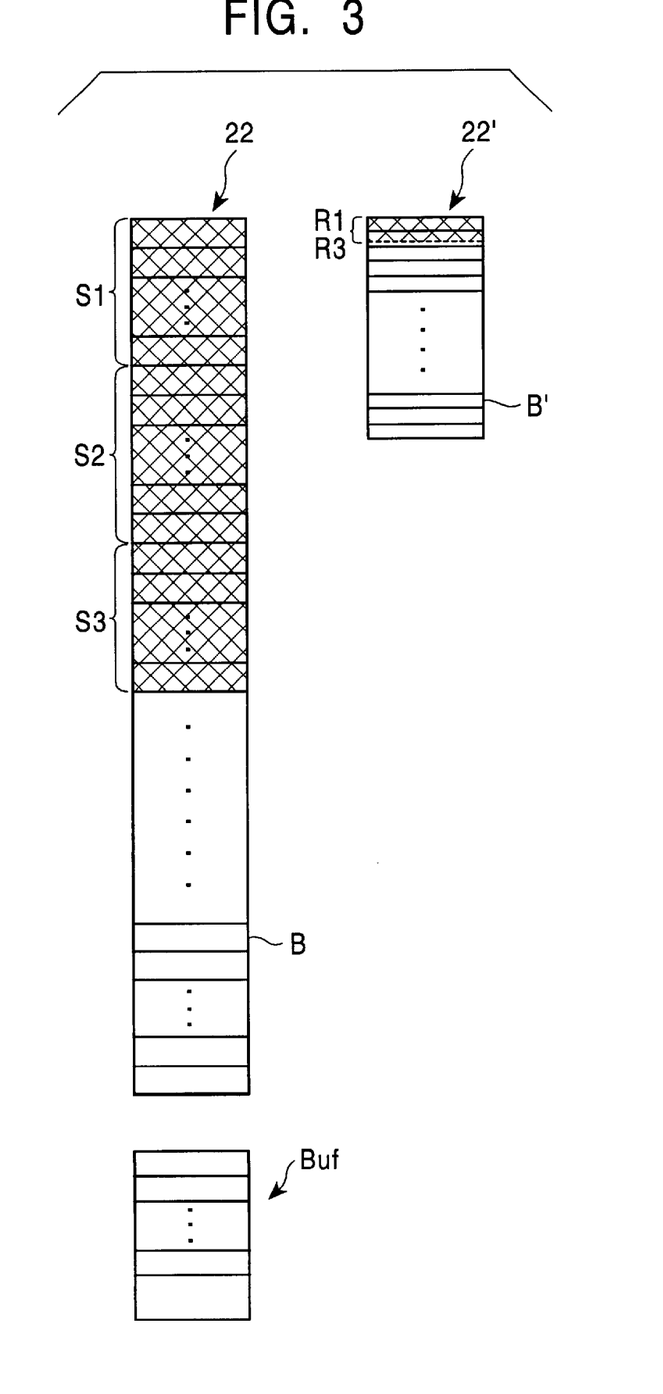
FIG. 3 is a diagram for explaining block deletion in accordance with he embodiment of the present invention.

In the foregoing embodiment, the blocks B having the same size are used to record the tunes S1, S2, etc. Blocks B' having different sizes may be defined additionally. A block B' may be selected according to the size of a tune or the size of a remnant R (R1 or R3) that cannot be accommodated by a block B. The tune or remnant may then be stored in the selected block B'. For example, when tunes are short, the frequency by which a block B is used incompletely to store the last part of a tune rises. An auxiliary memory 22' whose block size is 256 k bits may therefore be prepared. When the length of the last part of a tune using a block, R, is a half or less of 512 k bits, the part is stored in a block B' whose size is 256 k bits within the auxiliary memory 22' (See FIG. 2 and FIG. 3). It is a memory block selection control means that controls these memory blocks. Owing to the memory block selection control means, each tune can be deleted by performing comprehensive deletion, and the use efficiency of a memory can be improved. This variant of the compact musical signal reproducing apparatus is also an example of the present invention.

Moreover, in the aforesaid embodiment, the decoding programs are stored in the second semiconductor memory 24 in advance. Every time musical digital data is input through the input interface 21, a decoding program associated with a compression coding form adopted for the musical digital data may be stored in the second semiconductor memory 24 via the input interface 21. The decoding program may be used to decode the musical digital data. In this case, the decoding program is transmitted as, for example, a header of the musical digital data and then input through the input interface 21. The decoding program need not be updated every time the musical digital data is input through the input interface 21. Specifically, information of a compression coding form is read from a header of musical digital data stored in the first semiconductor memory 22. Only when it is judged that an associated decoding program is not stored in the second semiconductor memory 24, a request for the associated decoding program may be sent to a transmission source. Otherwise, a decoding program may be received periodically irrelevant to musical digital data. This variant of the compact musical signal reproducing Ad apparatus is also an example of the present invention. The digital data, decoding, and program distributing system will be described later.

Figure 4:
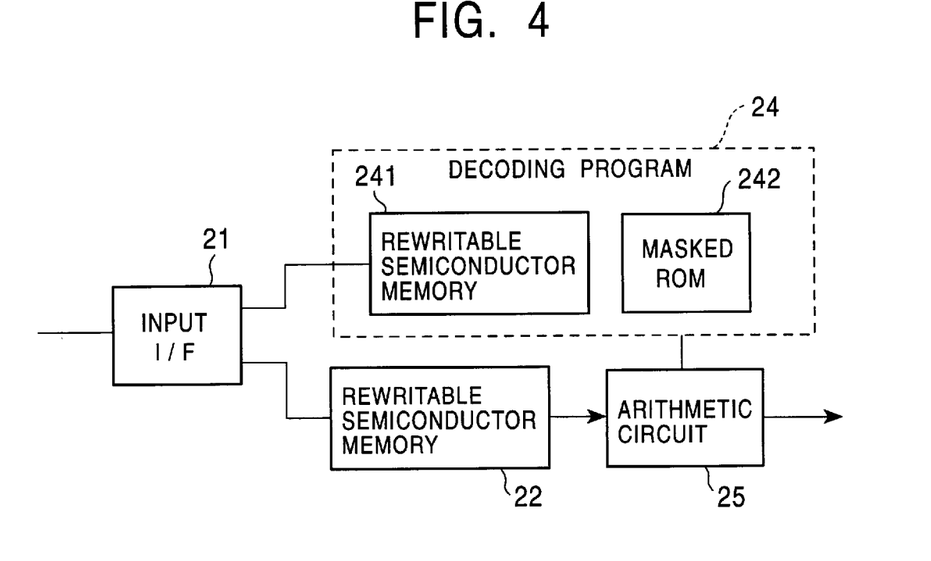
FIG. 4 is a diagram for explaining a second semiconductor memory in accordance with the embodiment of the present invention.

Moreover, in the aforesaid embodiment, the whole of the second semiconductor memory 24 can be rewritten. Alternatively, the semiconductor memory 24 may be, as shown in FIG. 4, composed of a flash memory 241 and a masked ROM 242, so that part of the second semiconductor memory 24 can be rewritten. In this case, the fundamental portions of the decoding programs may be stored in the masked ROM 242 of the second semiconductor memory 24. The portions of the decoding programs specialized according to given compression coding forms may be stored in the flash memory 241 of the second semiconductor memory 24. When a decoding program must be updated, only a portion stored in the flash memory 241 may be rewritten by receiving new data through the input interface 21. Moreover, the whole of the first semiconductor memory need not be able to be rewritten. The first semiconductor memory may be realized with a masked ROM alone or may be composed of a masked ROM and a flash memory. This variant of the compact musical signal reproducing apparatus is also an example of the present invention. Using memories for different purposes will be described later.

Figure 7:
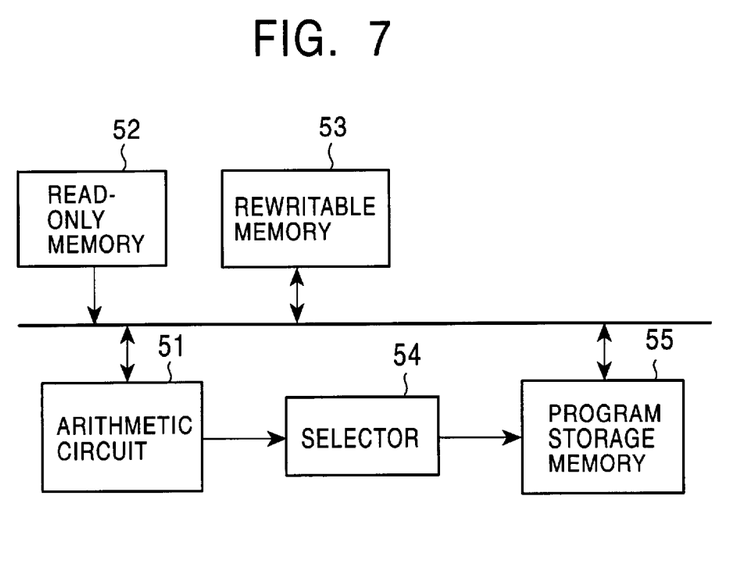
FIG. 7 is a diagram for explaining a memory structure in accordance with the embodiment of the present invention.

FIG. 7 is a diagram showing a memory structure for explaining an embodiment in which a rewritable memory and read-only memory are used in combination. An arithmetic circuit 51 for carrying out decoding, a read-only memory 52 (program ROM) in which a common function shared by decoding programs is stored, a rewritable memory 53 (program RAM) in which a program other than the common function that is a portion of a decoding program is placed if necessary, and a program storage memory 55 (flash memory) in which programs other than the common function that are portions of the plurality of kinds of decoding programs are stored are interconnected over a bus. A selector 54 for selecting a program to be executed by the arithmetic circuit 51 is connected to the program storage memory 55.

As the plurality of kinds of decoding programs, when they describe, for example, algorithms used to decompress musical data, programs written according to the TwinVQ, MPEG Audio Layer 3, ATRAC, and other coding forms are conceivable. Moreover, even when the TwinVQ is adopted as the coding form, different programs can be written by describing different sampling rates or compression rates for musical data to be decoded. These programs are thought to be included in the plurality of kinds of decoding programs. These algorithms contain in common a time base-to-frequency base conversion module and a data table used for arithmetic calculations. The module and data table are stored as a common portion in the read-only memory. Programs serving as the other portions are stored in the program storage memory. Consequently, it becomes unnecessary to store an overhead for organizing each program.

Figure 8:
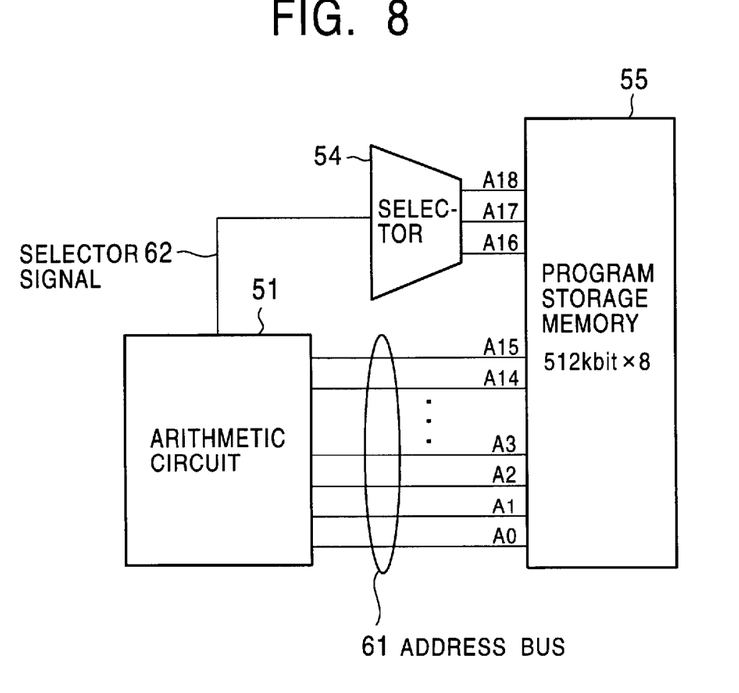
FIG. 8 is a diagram for explaining the configuration of a program selecting circuit in accordance with the embodiment of the present invention.

FIG. 8 is a diagram showing the configuration of a program selecting circuit for the program storage memory 55. A program selection signal sent from the arithmetic circuit 51 for carrying out decoding is input to the selector 54. With a signal sent from the selector 54, high-order digits of an address in the program storage memory 55, in which a plurality of non-common portion programs is stored, are controlled. For example, three high-order digits of an address are controlled with the signal of three bits (A16 to A18) long sent from the selector 54. Thus, any program area can be selected from among eight blocks each having a length of 512 k bits long.

Figure 9:
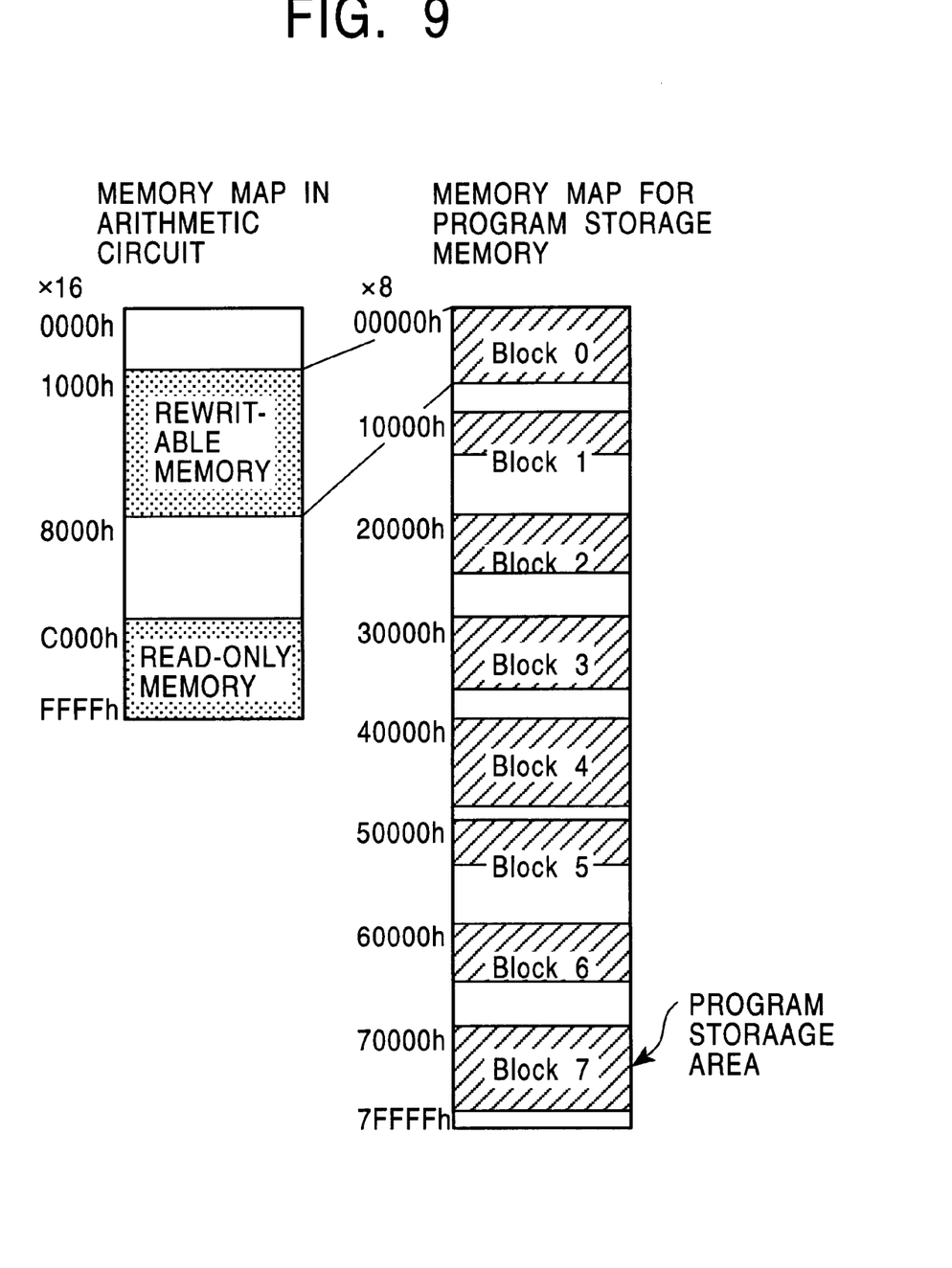
FIG. 9 is a diagram for explaining memory maps adopted for the memory structure shown in FIG. 7.

FIG. 9 is a diagram of a memory structure showing a memory space in the arithmetic circuit 51 and a memory space in the program storage memory 55. The arithmetic circuit 51 includes a read-only memory 52 and rewritable memory 53 internally or externally. The read-only memory 52 and rewritable memory 53 are mapped in the program memory space in the arithmetic circuit 51. On the other hand, a plurality of programs is stored in the program storage memory 55 so that a delimiter of each program will appear at a border between blocks indicated with three high-order address bits. One of the eight blocks is selected according to an instruction sent from the selector 54. A program contained in the selected block is copied entirely to the rewritable memory 53. Otherwise, part of the program is copied and the remaining part thereof is mapped into the memory space in the arithmetic circuit 51. The arithmetic circuit 51 is not concerned about in what memory a program to be executed resides physically. One decoding program is executed as a whole.

Among various high-efficiency coding forms, especially, a coding form for music requires a common procedure for processing a large portion of musical data. For especially a portable compact musical reproducing apparatus, the foregoing memory structure would prove useful from the viewpoints of compactness of a system and diverseness of data.

The rewritable memory 53 is usually realized with a small-capacity high-speed memory. The program storage memory 55 is realized with a large-capacity memory that requires a relatively long access time. Since the rewritable memory 53 is a small-capacity memory, a program may not be able to be entirely placed in the memory. The program is therefore divided into a portion that must be accessed quickly and the other portion that need not be accessed quickly. Only the portion that must be accessed quickly is copied to the rewritable memory 53. For executing a program resident in the program storage memory 55, a module that has been accessed least frequently must be accessed slowly (a normal action cycle is waited).

Moreover, in the foregoing embodiment, a flash memory is used to realize the first semiconductor memory 22 and second semiconductor memory 24. Alternatively, the other rewritable memory, for example, an FRAM can be used. This variant of the compact musical signal reproducing apparatus is also an example of the present invention.

Moreover, a DRAM or SRAM can also be adopted as a rewritable memory. However, when the DRAM is adopted, a refreshing circuit is required. When the SRAM is adopted, battery backup must be carried out in a power-off state. For realizing a compact design, it is preferred to adopt the flash memory that operates in the form of a sole chip and does not require execution of battery backup in the power-off state.

Moreover, in the aforesaid embodiment, the audio input terminal 11, A/D converter 12, and encoding circuit 13 are not incorporated in the apparatus 20. Alternatively, they may be incorporated therein. Otherwise, they may be included separately from a channel for receiving an external signal. Moreover, an incorporated encoding circuit may be composed of, like the decoding circuit 23, a rewritable semiconductor memory and programmable arithmetic means so that an encoding program received externally can be used for encoding. The incorporated encoding circuit 13 can cope with diverse compression coding forms. This variant of the compact musical signal reproducing apparatus is also an example of the present invention.

Moreover, in the aforesaid embodiment, the TwinVQ is adopted as a coding form used to encode or decode a musical digital signal. Alternatively, the other audio coding forms including the MPEG Audio may be adopted. This variant of the compact musical signal reproducing apparatus is also an example of the present invention.

Figure 5:
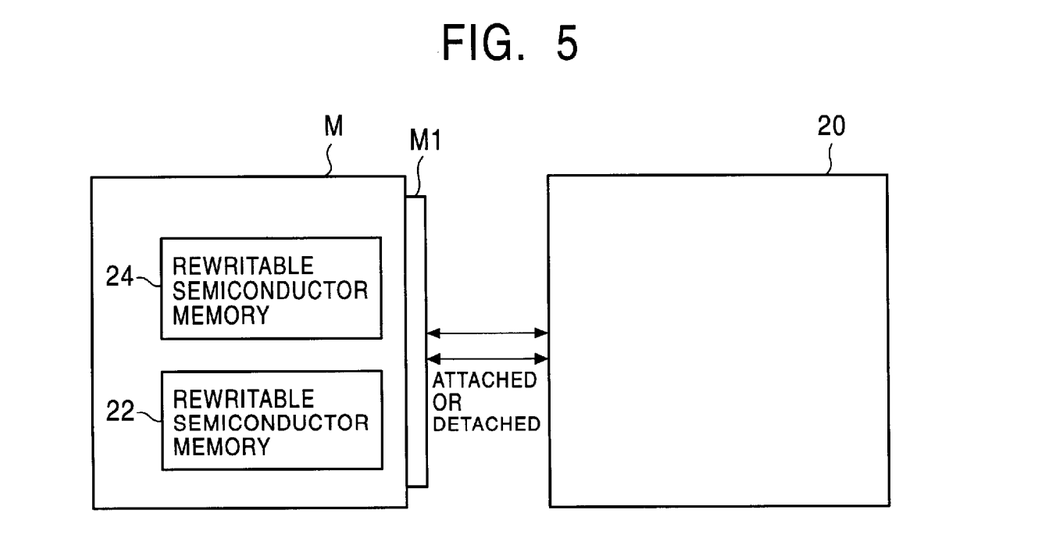
FIG. 5 is a diagram for explaining a memory module in accordance with the embodiment of the present invention.

Moreover, in the aforesaid embodiment, the first semiconductor memory 22 and second semiconductor memory 24 are incorporated in the apparatus. Alternatively, either of the first and second semiconductor memories, or the wholes or parts of them may be realized in the form of a detachable module. For example, as shown in FIG. 5, the first semiconductor memory 22 and second semiconductor memory 24 may be integrated into a module M. The module M can be detached from the apparatus 20. The module M includes, for example, a connector having a unique memory interface, or a contact type connector M1 conformable to the standards on the SSFDC or compact flash memory. The module M is detached or attached from or to the apparatus 20 via the contact type connector M1. In this case, it becomes easier to increase a storage capacity or to distribute music or decoding programs contained in the module M to the others. This variant of the compact musical signal reproducing apparatus is also an example of the present invention.

Moreover, a general-purpose microprocessor may be adopted for the arithmetic circuit. However, when the general-purpose microprocessor is adopted, a peripheral chip set is needed. It is however hard to carry out voice decoding as real-time processing because of the time required for arithmetic operations. For designing an apparatus compactly or designing an apparatus dedicated to reproducing of music, it is preferred to adopt the DSP designed exclusively for processing signals of audio frequencies.

Especially for realizing a compact apparatus and fast arithmetic operations, it is preferred to use the DSP as the arithmetic circuit and to execute a decoding program using a high-speed RAM in the DSP. The DSP needs a high-speed memory for carrying out arithmetic operations quickly. In this case, decoding programs are stored in a rewritable flash memory serving as the second semiconductor memory. A decoding program is transferred (loaded) to the high-speed RAM in the DSP for a decoding operation. The decoding operation is then started.

Furthermore, a decoding operation may be carried out using the high-speed RAM in the DSP and an external memory of the DSP in combination. In this case, for example, the decoding operation is executed with a code book, which is used for the decoding operation, partly placed in an external flash memory. When memories are thus used for different purposes, speeding up an operation can be achieved. Nevertheless, the high-speed RAM in the DSP is not requested to offer a large storage capacity.

Next, a digital information distributing system to which the digital information reproducing apparatus of the present invention is adapted will be described.

A musical information distributing system A1' of this embodiment is an example in which the present invention is implemented in distribution of musical information (tunes) to customers. Hereinafter, the tunes to be served will be called musical data (equivalent to digital information).

Figure 6:
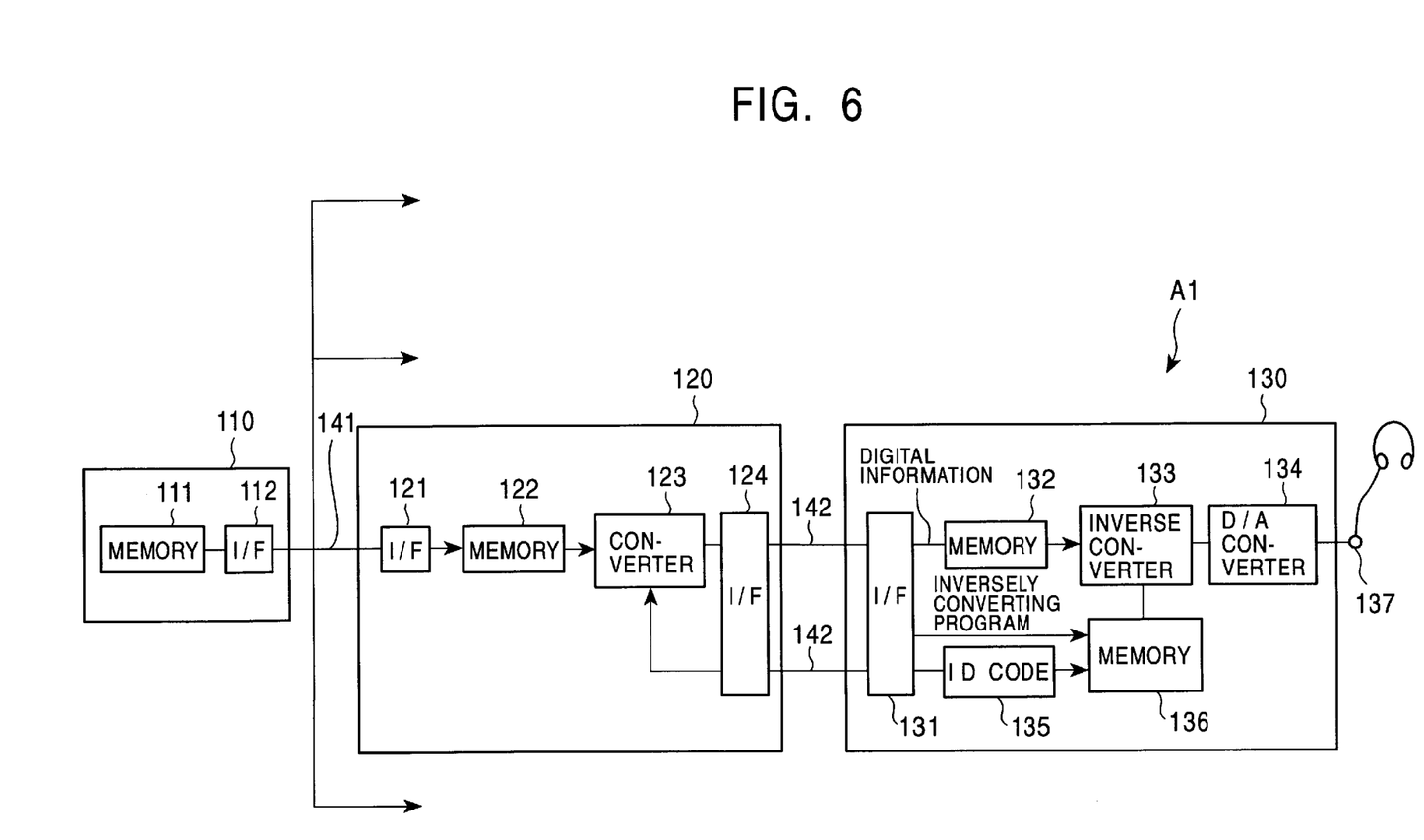
FIG. 6 is a block diagram showing the outline configuration of a musical information distributing system A1 in accordance with an embodiment of the present invention.

As shown in FIG. 6, the musical information distributing system A1 consists of a service center 110 (digital information managing means), a music distributing terminal 120 (digital information distributing means), and a music reproducing apparatus 130 (digital information reproducing means).

At the service center 110, a large amount of musical data to be sold is preserved and managed in a centralized manner. The musical data is digitized and compressed to be encoded highly efficiently (subjected to given conversion). The musical data is stored as files in a memory 111. In the memory 111, decoding programs (inversely converting programs) for decoding the musical information that has been compressed to be encoded are stored. Moreover, the service center 110 is connected to a plurality of music distributing terminals 120 over a communicating means 141. The communicating means 141 is presumably, for example, a public switched network (analog telephone network, ISDN, PHS network, etc.), the Internet, satellite communications, and others. Communications over the communicating means 141 are controlled by a communication interface 112 in the service center 110 or a communication interface 121 in each music distributing terminal 120.

Moreover, the music distributing terminals 120 connected to the service center 110 are installed in, for example, downtown shopping centers, convenience stores, game centers, stations, and other places. Each music distributing terminal 120 includes a memory 122 in which musical data transferred from the service center 110 and the decoding programs are stored, and a converter 123 for performing given processing (which will be detailed later) on musical data, which is retrieved from the memory 122, using an ID code specific to the music reproducing apparatus 130. Musical data stored in the memory 122 is replaced with up-to-date information sent from the service center 110 and thus updated from time to time. Moreover, the music distributing terminal 120 is connected to the music reproducing apparatus 130 over a connecting means 142. The connecting means 142 includes, for example, cable connections designed for serial communication or parallel input/output, infrared communication conformable to the IrDA standard or the like, or non-contact connections such as radiocommunication. Moreover, when the music reproducing apparatus 130 is shaped like a card, the PCMCIA interface may be adopted. Data transfer over the connecting means 142 is controlled by a communication interface 124 in the music distributing terminal 120 or a communication interface 131 in the music reproducing apparatus 130.

Moreover, the music reproducing apparatus 130 is used by an individual customer and housed in a portable compact case. The music reproducing apparatus 130 includes a memory 132, inverse converter 133, D/A converter 134, ID code storage ROM 135, and memory 136. In the ID code storage ROM 135, an ID code specific to the music reproducing apparatus 130 is stored. In the memory 132, musical data received from the music distributing terminal 120 over the connecting means 142 is stored in a compressed and thus encoded state. Moreover, decoding programs received from the music distributing terminal 120 over the connecting means 142 are stored in the memory 136 realized with the rewritable semiconductor memory. In the memory 136, an inverse processing program for carrying out inverse processing of the given processing that is carried out by the converter 123 in the music distributing terminal 120 is stored in advance. Moreover, the inverse converter 133 performs inverse processing on musical data retrieved from the memory 132 using the ID code stored in the ID code storage ROM 135 according to the inverse processing program stored in the memory 136. Moreover, the musical data is decoded according to the decoding program stored in the memory 136. The D/A converter 134 converts digital musical data, which results from inverse processing and decoding performed by the inverse converter 133, into an analog signal. The musical data converted into the analog signal by the D/A converter 134 is output externally (for example, to a headphone or amplifier) through an output terminal 137.

Next, a procedure according to which information is distributed to customers by the musical information distributing system A1 will be described practically.

First, a given number of musical data items and necessary decoding programs are transmitted from the service center 110 to each music distributing terminal 120 over the communicating means 141. In the music distributing terminal 120, the musical data and decoding programs received from the service center 110 are stored in the memory 122, and the musical data are thus made ready to be sold to customers. The musical data stored by the music distributing terminal 120 is updated (deleted or added) by the service center 110 at a frequency of, for example, once a day.

A customer connects the music reproducing apparatus 130 to the music distributing terminal 120 over a cable (connecting means 142) or the like. According to a given method (for example, by pressing a button), a desired one is selected from among the musical data stored by the music distributing terminal 120.

When the customer has selected musical data, the music distributing terminal 120 retrieves a specific ID code from the ID code storage ROM 135 in the music reproducing apparatus 130 over the connecting means 142. The converter 123 retrieves the musical data selected by the customer from the memory 122. The musical data (placed in a compressed and thus encoded state) is then subjected to the processing based on the ID code. The ID code-based processing is, for example, processing that the ID code is inserted to several specified positions in the musical data that has been compressed to be encoded. The musical data processed by the converter 123 is transmitted to the memory 132 in the music reproducing apparatus 130 over the connecting means 142. At this time, a decoding program associated with a compression coding form adopted for the musical data to be transmitted may not be stored in the memory 136 in the music reproducing apparatus 130. In this case, the decoding program is also transmitted from the music distributing terminal 120 to the memory 136 in the music reproducing apparatus 130.

The musical data and decoding program are received and stored in the memory 132 and memory 136 respectively. In the music reproducing apparatus 130, the inverse converter 133 then retrieves the musical data from the memory 132. The inverse converter 133 then performs inverse processing on the musical data (that has been compressed to be encoded and subjected to the ID code-based processing) using the ID code stored in the ID code storage ROM 135 according to the inverse processing program stored in the memory 136. The inverse processing is presumably, for example, processing that the ID codes appended by the converter 123 are removed from the musical data according to the ID code stored in the ID code storage ROM 135. Needless to say, unless the ID codes appended by the converter 123 agree with the ID code stored in the ID code storage ROM 135, inverse processing cannot be carried out correctly. For example, even if musical data received from the music distributing terminal 120 is copied to another music reproducing apparatus 130, the inverse processing will fail. The musical data cannot therefore be restored. When the inverse processing is completed, the inverse converter 133 decodes the musical data, which has been inversely processed (compressed and thus encoded), according to the decoding program stored in the memory 136. The thus decoded musical data is converted into an analog signal by the D/A converter 134 and output externally through the output terminal 137.

As described above, in the musical information distributing system A1 of this embodiment, not only musical data that has been compressed and thus encoded but also a decoding program used to decode the musical data are transmitted from the music distributing terminal 120 to the music reproducing apparatus 130. In the music reproducing apparatus 130, the musical data is decoded according to the transmitted decoding program. Whether a coding form adopted for musical data has been modified or a different coding form is adopted for each musical data, the music reproducing apparatus can handle musical data properly.

Moreover, the music distributing terminal 120 reads a specific ID code stored by the music reproducing apparatus 130, and then performs given processing on musical data using the ID code. The music distributing terminal 120 then transmits the musical data to the music reproducing apparatus 130. The music reproducing apparatus 130 performs inverse processing on the musical data using the own ID code, and then reproduces the musical data. Even when musical data received from the music distributing terminal 120 is copied to another music reproducing apparatus 130, the inverse processing will fail. The musical data cannot therefore be reproduced. Thus, wicked copy of musical data can be prevented effectively.

In the aforesaid embodiment, only when a decoding program associated with musical data to be transmitted does not reside in the musical reproducing apparatus 130, the decoding program is transmitted from the music distributing terminal 120 to the music reproducing apparatus 130. Alternatively, musical data and an associated decoding program may always be transmitted in pair. This will lead to an increased amount of transmitted data. However, control will be simplified.

Moreover, an inverse processing program based on an ID code may be, like the decoding program, able to be transmitted from the music distributing terminal 120 to the music reproducing apparatus 130. Thus, for example, the sequence of the ID code-based processing can be modified periodically. Eventually, wicked copy can be prevented more effectively.

In the aforesaid embodiment, the music distributing terminals 120 are connected to the service center 110. The present invention is not limited to this form. Alternatively, the music distributing terminals 120 may be constructed as stand-alone apparatuses. However, in this case, there arises a problem that much labor and time are required to update musical data in the music distributing terminals 120.

Moreover, in the aforesaid example, digital information to be distributed is musical (voice) information. Alternatively, image information, news (character information), and others will do.

What is claimed is:

1. A digital information reproducing apparatus, comprising:

a first semiconductor memory into which digital data that has been encoded highly efficiently is stored;

a second semiconductor memory into which decoding programs used to carry out decoding that is inverse processing of the high-efficiency encoding are stored, wherein the whole or part of said second semiconductor memory can be rewritten and said second semiconductor memory comprises a read-only memory in which a common portion shared by a plurality of kinds of decoding programs is stored and a rewritable memory into which portions of said plurality of kinds of decoding programs other than the common portion are stored; and a decoding means for decoding digital data stored in said first semiconductor memory according to a decoding program stored in said second semiconductor memory and associated with the digital data stored in said first semiconductor memory, wherein said plurality of kinds of decoding programs is stored in said second semiconductor memory; and said decoding means selects a decoding program from among the plurality of kinds of decoding programs according to information concerning encoding which is appended to each digital data, and then carries out decoding.

2. A digital information reproducing apparatus according to claim 1, wherein the whole or part of said second semiconductor memory is a detachable module.

3. A digital information reproducing apparatus according to claim 1, wherein the whole or part of said first semiconductor memory is a detachable module.

4. A digital information reproducing apparatus according to claim 1, wherein the digital information is voice information, further comprising a D/A converter for converting an output signal of said decoding means into an analog signal and an electric-to-acoustic converter for converting an output signal of said D/A converter from an electric signal to an acoustic signal.

5. A digital information reproducing apparatus, comprising:

a first semiconductor memory into which digital data that has been encoded highly efficiently is stored;

a second semiconductor memory into which decoding programs used to carry out decoding that is inverse processing of the high-efficiency encoding are stored, wherein the whole or part of said second semiconductor memory can be rewritten and said second semiconductor memory comprises:

a read-only memory in which a common portion shared by said plurality of kinds of decoding programs is stored;

a program storage memory into which portions of said plurality of kinds of decoding programs other than the common portion are stored;

a selector for selecting a portion of a decoding program, which has been selected to be associated with digital data to be decoded from among said plurality of kinds of decoding programs, other than the common portion from among programs stored in said program storage memory; and a rewritable memory in which a program selected by said selector and then copied from said program storage memory is stored; and a decoding means for decoding digital data stored in said first semiconductor memory according to a decoding program stored in said second semiconductor memory and associated with the digital data stored in said first semiconductor memory, wherein a plurality of kinds of decoding programs is stored in said second semiconductor memory; and said decoding means selects a decoding program from among the plurality of kinds of decoding programs according to information concerning encoding which is appended to each digital data and then carries out decoding.

6. A digital information reproducing apparatus, comprising:

a first semiconductor memory into which digital data that has been encoded highly efficiently is stored;

a second semiconductor memory into which decoding programs used to carry out decoding that is inverse processing of thee high-efficiency encoding are stored, wherein the whole or part of said second semiconductor memory can be rewritten and said second semiconductor memory comprises a read only memory in which a common portion shared by a plurality of kinds of decoding programs is stored and a rewritable memory into which portions of said plurality of kinds of decoding programs other than the common portion are stored;

a decoding means for decoding digital data stored in said first semiconductor memory according to a decoding program stored in said second semiconductor memory and associated with e digital data stored in said first semiconductor memory; and a receiver for receiving externally all or part of the decoding programs to be stored in said second semiconductor memory; and wherein a plurality of kinds of decoding programs is stored in said second semiconductor memory; and said decoding means selects a decoding program from among the plurality of kinds of decoding programs according to information conning encoding which is appended to each digital data, and then carries out decoding.

7. A digital information reproducing apparatus, comprising:

a first semiconductor memory into which digital data that has been encoded highly efficiently is stored, wherein the whole or part of said first semiconductor memory can be rewritten;

a second semiconductor memory into which decoding programs used to carry out decoding that is inverse processing of the high-efficiency encoding are stored, wherein the whole or part of said second semiconductor memory can be rewritten and said second semiconductor memory comprises a read-only memory in which a common portion shared by a plurality of kinds of decoding programs is stored and a rewritable memory into which portions of said plurality of kinds of decoding programs other than the common portion are stored;

a decoding means for decoding digital data stored in said first semiconductor memory according to a decoding program stored in said second semiconductor memory and associated with the digital data stored in said first semiconductor memory; and a receiver for receiving externally digital data to be stored in said first semiconductor memory and information concerning encoding of the digital data, wherein a plurality of kinds of decoding programs is stored in said second semiconductor memory; and said decoding means selects a decoding program from among the plurality of kinds of decoding programs according to information concerning encoding which is appended to each digital data, and then carries out decoding.

8. A digital information reproducing apparatus, comprising:

a first semiconductor memory into which digital data that has been encoded highly efficiently is stored, wherein said first semiconductor memory is divided into a plurality of blocks, and the digital data is stored so that the start thereof will appear at the start of a block;

a second semiconductor memory into which decoding programs used to carry out decoding that is inverse processing of the high-efficiency encoding are stored wherein the whole or part of said second semiconductor memory can be rewritten and said second semiconductor memory comprises a read-only memory in which a common portion shared by a plurality of kinds of decoding programs is stored and a rewritable memory into which portions of said plurality of kinds of decoding programs other than the common portion are stored; and a decoding means for decoding digital data stored in said first semiconductor memory according to a decoding program stored in said second semiconductor memory and associated with the digital data stored in sad first semiconductor memory, wherein a plurality of kinds of decoding programs is stored in said second semiconductor memory; and said decoding means selects a decoding program from among the plurality of kinds of decoding programs according to information concerning encoding which is appended to each digital data, and the carries out decoding.

9. A digital information reproducing apparatus according to claim 8, wherein said first semiconductor memory consists of blocks of different sizes, further comprising a memory block selection control means for, when digital data is not accommodated by a certain block, selecting another block whose size corresponds to the size of the remnant of the digital data, and placing the remnant in the another block.

10. A digital information reproducing apparatus, comprising:

a receiver for receiving digital data that has been highly efficiently encoded from an external source;

a first semiconductor memory into which an encoded data portion of the digital data that has been encoded highly efficiently is received and stored, said first semiconductor memory being formed to be rewritable;

a second semiconductor memory into which a decoding programs portion of the digital data used to carry out decoding that is inverse processing of the high-efficiency encoding is received and stored, at least a part of said second semiconductor memory being formed to be rewritable; and a decoding means for decoding the encoded data portion of the digital data stored in said first semiconductor memory according to the decoding program portion of the digital data stored in said second semiconductor memory, wherein the encoded data portion and the decoding program portion of the digital data are received together and at least a part of the decoding program used to decode the encoded portion of the digital data is provided in said decoding program portion.

11. A digital information distributing system, comprising:

a digital information distributing apparatus for storing digital information;

a digital information reproducing apparatus, connected to said digital information distributing apparatus, for receiving, storing, and reproducing the digital information stored by said digital information distributing apparatus;

a conversion arithmetic means, incorporated in said digital information distributing apparatus, for performing a predetermined conversion on the digital information;

a transmitting means, incorporated in said digital information distributing apparatus, for transmitting the converted digital information and a program used to inversely convert the converted digital information;

a receiving means, incorporated in said digital information reproducing apparatus, for receiving the converted digital information and the inverse conversion program;

a rewritable semiconductor memory incorporated in said digital information reproducing apparatus, and used to receive and store the converted digital information from said receiving means; and an inverse conversion arithmetic means, incorporated in said digital information reproducing apparatus, for inversely converting the converted digital information according to the inverse conversion program.

12. A digital information distributing system according to claim 11, wherein the given conversion is compression encoding, and the inverse conversion is decoding of digital information that has been compressed and thus encoded.

13. A digital information distributing system according to claim 11, further comprising an ID code memory means incorporated in said digital information reproducing apparatus and used to store an ID code specific to said digital information reproducing apparatus, and an ID code reading means, incorporated in said digital information distributing apparatus, for reading the ID code stored in said ID code memory means, wherein said given conversion includes processing based on the ID code, and said inverse conversion arithmetic means in said digital information reproducing apparatus carries out inverse processing of the ID code-based processing.

* * * * *